Feb. 13, 1934. C. A. JOERISSEN Re. 19,076

TYPEWRITING MACHINE

Original Filed March 22, 1926 3 Sheets-Sheet 1

Inventor
Carl A. Joerissen.
By Cauldman, Bryant & Darby
Attorneys

Feb. 13, 1934. C. A. JOERISSEN Re. 19,076

TYPEWRITING MACHINE

Original Filed March 22, 1926 3 Sheets-Sheet 2

Inventor

Carl A. Joerissen.

By Coulman, Bryant & Darby

Attorneys

Feb. 13, 1934. C. A. JOERISSEN Re. 19,076

TYPEWRITING MACHINE

Original Filed March 22, 1926 3 Sheets-Sheet 3

Inventor
Carl A. Joerissen,
By Lenhman, Dugan & Daley
Attorneys

Reissued Feb. 13, 1934 Re. 19,076

UNITED STATES PATENT OFFICE 19,076

TYPEWRITING MACHINE

Carl A. Joerissen, Washington, D. C.

Original No. 1,846,339, dated February 23, 1932, Serial No. 96,602, March 22, 1926. Application for reissue December 15, 1933. Serial No. 702,611

28 Claims. (Cl. 197—25)

The present invention relates to improvements in typewriting machines, and particularly to means whereby the operation of such a machine is effected with a minimum amount of noise.

Particularly the object of the invention is to overcome the objectionable noise produced by the type bars striking the platen and to provide a key action whereby the type bars will be forced into printing relation with the platen by a positive movement, securing clear impressions, but without forcibly striking the platen.

I am aware that it has been heretofore proposed to provide typewriter key actions in which the noise produced by the type bars striking the platen will be materially reduced, but by the present invention the movement of all the parts is positively effected through connections with the key lever, and without the necessity of employing auxiliary parts for imparting movement to the type bars.

While the invention hereinafter described may be employed in connection with typewriting machines having type bars of various forms and supported in different relations with regard to the printing roll or platen, I have illustrated embodiments thereof in connection with a type action, in which the type bars are pivotally supported and adapted to move upward and rearward into printing relation with a relatively elevated platen.

Figure 1:
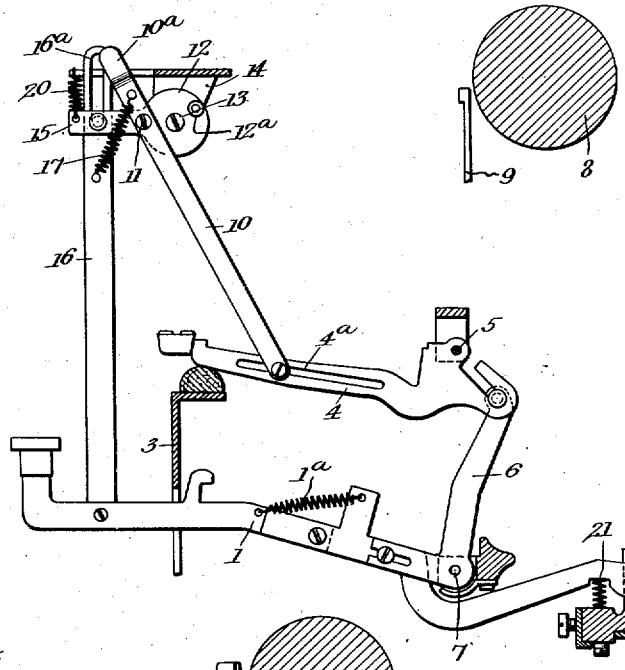
Figure 1 is an elevation of a typewriter key action embodying the present invention, certain parts of the machine being shown in section and the type bar being in its normal inactive position.

In the drawings many of the parts are shown more or less conventionally, and the views are, to a considerable extent, diagrammatic. There can, of course, be material variation as regards proportions and sizes of the several parts, and also considerable modification in many of the details without departing from the invention. Except where specifically referred to in the appended claims, it is not intended to limit the invention to the exact details shown, and the drawings are to be considered illustrative rather than restrictive of the invention.

In Figures 1 to 6 inclusive, I have illustrated the invention as embodied in a key action mechanism of substantially the type employed in the well known Underwood typewriting machine comprising a key lever 1 fulcrumed at its rear end upon a rod 2, and extending through slots in a comb plate or frame member 3. The type bar 4 is pivotally mounted upon a rod 5, which is of arc shape so that the several type bars of the machine lie in the form of a transversely curved basket.

Movement of the key lever 1 is transmitted to the type bar 4 by a sub-lever 6, fulcrumed at 7 on the machine frame. When the forward, outer, end of the key lever 1 is depressed, the type bar 4 will be caused to swing upward and rearward about its pivot 5 into printing relation with the platen 8 and the usual type guide 9 in the manner well understood.

In the drawings I have only illustrated a single key action, and it will be understood that this is to be duplicated throughout the series of type bars in the ordinary manner.

10 designates a link which is pivotally supported at an intermediate point of its length, and has one end connected to the type bar 4. As shown, the pivot 11 of the link 10 is carried by a pivotally mounted fulcrum support 12, which is supported to rock about an axis 13 extending through the members of a depending comb plate or frame section 14. The fulcrum support 12 is provided with a forward extension 15 that engages a link or rod 16 extending upward from and pivotally connected at its lower end to the key lever 1.

Figure 2:
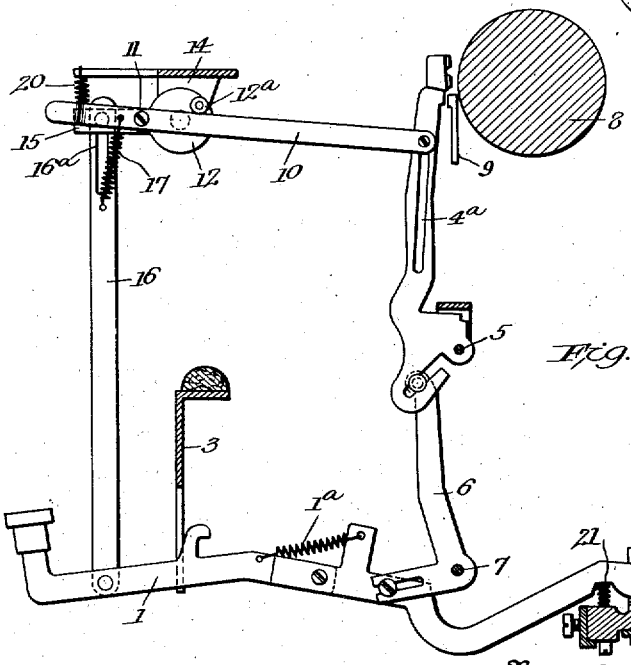
Figure 2 is a similar view showing the position of parts when the key lever has been partly depressed and the movement of the type bar toward printing relation with the platen checked.
Figure 4:
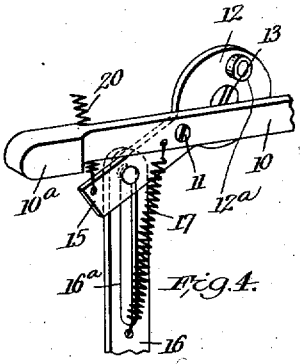
Figure 4 is a detail, on a slightly enlarged scale, of a portion of the connection between the key lever and the type bar checking means.

The link or member 10 is eccentrically mounted on the fulcrum support 12, and it will be seen that as the type bar swings upward from its normal inactive position represented in Figure 1 to the substantially vertical position shown in Figure 2, such member will be brought into such relation to the axis 13 of the fulcrum support and said bar as to check the swinging movement of the type bar just prior to its coming into contact with the platen.

The engagement of the link or rod 16 with the extension 15 of the fulcrum support 12 will, as the key lever continues to move downward from the position shown in Figure 2, cause a bodily rocking of the fulcrum support about the axis 13, thus moving the connecting member 10 in the direction of its length and positively forcing the type bar toward the platen, completing its movement into printing relation therewith.

Figure 3:
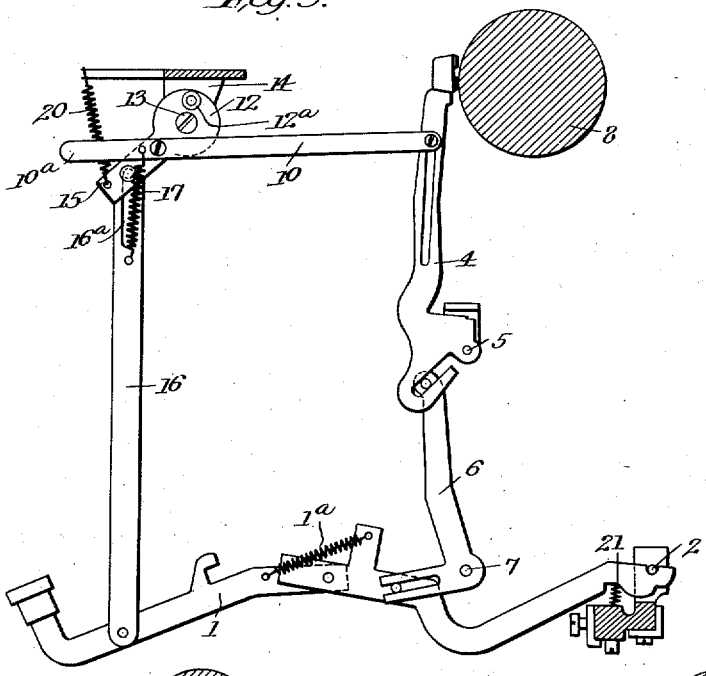
Figure 3 is a simlar view showing the relation of the parts on the completion of the depression of the key lever and the movement of the type bar into printing relation with the platen.

As shown in Figures 1 to 3, the stem of the type bar 4 is provided with a longitudinally extending slot 4a into which projects a pin or stud at the inner end of the link or checking member 10, and a spring 17 connects the checking member 10, at the opposite side of its fulcrum 11 from the type bar, with the connecting link or rod 16 that extends upward from the key lever 1. The outer end of the link or checking member 10 may be slightly weighted, as indicated at 10a, so that this member will offer practically no resistance to the initial upward and rearward swinging movement of the type bar.

As shown, the link or connecting rod 16 has formed therein adjacent its upper end a longitudinal slot 16a which receives a pin projecting laterally from the forward extension 15 of the pivotally mounted fulcrum support 12 and these parts are so related that the upper end of said slot 16a will engage said pin on the fulcrum support substantially at the moment that the movement of the type bar into printing relation with the platen is checked as before described, at which time the connection of the checking member 10 with the type bar and the fulcrum 11 are in substantial horizontal alignment with the axis 13 of the fulcrum support.

Therefore, while the movement of the type bar toward printing relation with the platen will be checked there will be no material interference with downward movement of the key lever and the completion of the movement of the type bar into printing relation with the platen will be effected by a positive force exerted by pull of the link 16 on the extension 15 and a consequent movement in the direction of the length of the connecting member 10.

A spring 20 may be interposed between a portion of the typewriter frame and the extension 15 of each fulcrum support to assist in returning the parts to normal position, the machine, of course, including the usual springs 21 for lifting the key levers after the same are relieved from pressure. As shown, the key levers 1 are of the common form including two pivotally connected sections having a coil spring 1a interposed between them, whereby the checking of the upward and rearward swinging movement of the type bar will not interfere with the downward movement of the key and outer end of the key lever through the required stroke.

If desired, each fulcrum support 12 may be provided with a short lateral projection 12a, which will extend over the upper edge of the checking member 10 when the parts are in the position shown in Figures 2 and 3, and, under the pull exerted by the spring 20 will assist in starting the turning movement of said checking member about its fulcrum so that it will not in any way interfere with the return of the type bar to its normal inactive position.

Figure 5:
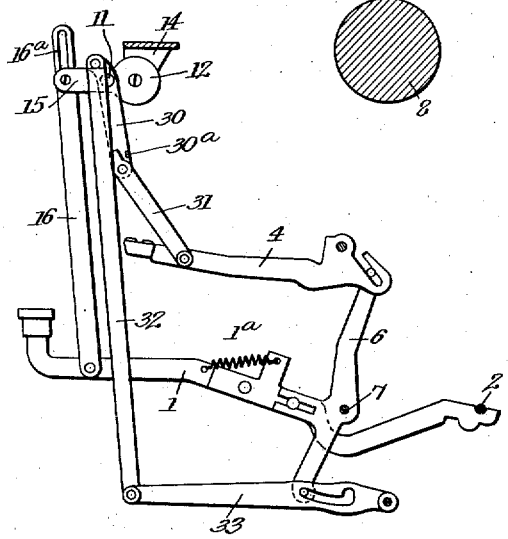
Figures 5 and 6 are elevational views of a modification showing the parts, respectively, in the positions assumed when the type bar is at rest and in printing relation to the platen.
Figure 6:
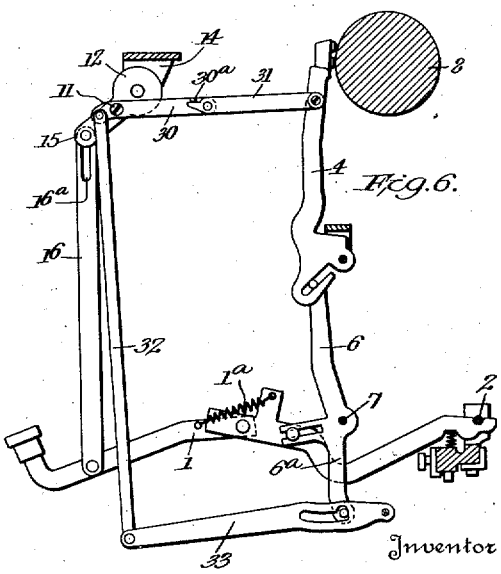

In the embodiment of the invention illustrated in Figures 5 and 6, the means for checking the movement of the type bar toward printing relation with the platen includes a toggle, one member 30 of which is fulcrumed on the pivotally mounted fulcrum support 12, and the other member 31 of which is pivotally connected to the type bar 4. The forward end of the toggle member 30 is connected by a link 32 with a lever 33, which is arranged below the plane of the key lever 1, and is adapted to be rocked about its fulcrum 34 by the movement of a downwardly extending arm 6a of the sub-lever 6.

With this arrangement it will be seen that as the type bar moves from its normal inactive position shown in Figure 5 upward and rearward toward the platen 8, the members 30, 31, of the toggle will come into a substantially straight line relation, thus checking the movement of the type bar, and when the fulcrum support 12 is rocked about its pivotal axis the toggle will exert a positive push upon the type bar, completing the movement thereof into printing relation with the platen. The final operative swing of the fulcrum support is permitted by the pin of the pin and slot connection between members 6a and 33 coming under the upward enlargement at the right end of the slot (Fig. 6).

That part of the fulcrum support between its swinging axis and the screw 11 constitutes a link portion swingable downwardly from its normal position of rest and rearwardly to complete the stroke of the type bar. The fulcrum support being thus normally poised, its inertia is overcome with the least possible effort. Spring 1a in straightening the key bar moves link 16 upwardly to restore the fulcrum support, the usual key bar return spring assisting in this action.

A suitable stop 30a may be provided about the pivotal connection between the toggle members 30, 31, to prevent any possibility of this connection being moved upward beyond that in which the toggle members are in substantially straight line relation, as shown in Figure 6.

Figure 7:
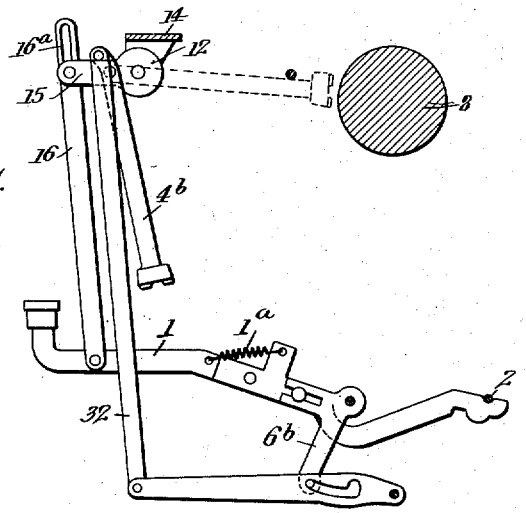
Figures 7 and 8 are views, respectively similar to Figures 5 and 6, of a slightly modified form of key action, embodying the invention.
Figure 8:
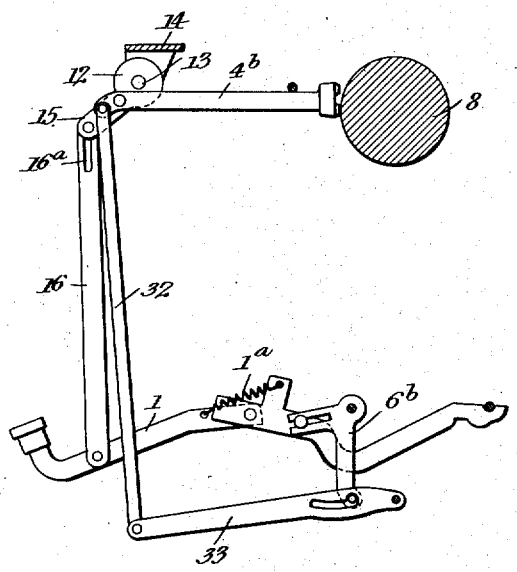

In the embodiment of the invention illustrated in Figures 7 and 8 the type bar, 4b, is pivoted directly to the pivotally mounted fulcrum support 12 and the outer end thereof is connected by the link 32 with the lever 33.

A sub-lever 6b is interposed between the key lever 1 and the lever 33, so that the initial depression of the key lever will actuate the lever 33 and through its connection with the type bar swing the latter into alignment with the type guide 9 and the platen 8.

The extent of movement permitted the lever 33 is such that swinging movement of the type bar will be checked as said bar comes into substantial alignment with the axis of the fulcrum support 12 and the pivotal connection of the bar with said support.

The length of the type bar is such, and it is so related to the other parts, that with the several members in the relation described the printing head on the type bar will not touch the platen. However, as the fulcrum support 12 is rocked by the positive pull exerted through the connection 16, as the downward movement of the key lever continues, the type bar will receive a slight movement substantially in the direction of its length which will complete the movement of said bar into printing relation with the platen.

It is believed that the operation and advantages of the invention will be readily understood from the foregoing description in connection with the drawings. It will be seen that the invention provides a very simple means for preventing the sudden striking of the type bars against the platen, which is the cause of the objectionable noise incident to operating such machines. By the arrangement of parts described, the movement of the type bar into printing relation with the platen is checked and the completion of such movement is caused by a positive connection between the key lever and the type bar.

It will be seen that whether a special checking means made as a single member extending continuously from its pivotal connection with the fulcrum support 12 to the type bar or in the form of a toggle, as illustrated in Figures 5 and 6, is interposed between the fulcrum support and the type bar or the latter is pivotally connected directly to said support the turning of said support which effects the completion of the type bar movement to printing relation with the platen is due to a positive connection with the key lever.

In the drawings I have illustrated a key action located approximately at the middle, transversely, of the machine and wherein the link connections 16 and 32 may be perfectly straight, one piece, elements. The corresponding parts of key actions situated at or nearer the ends or sides of the type bar basket will, of course, have to be slightly modified, the exact form of each said connection depending upon the location of the particular key action in the machine.

However, in all instances there is a positive connection between the key lever and the fulcrum support for the checking means for rocking said support and effecting a movement in the direction of the length of said means for effecting completion of the movement of the type bar to printing relation to the platen.

Having thus described the invention, what is claimed as new is:

I claim:

1. In a typewriting machine, the combination of a platen, a key lever, a type bar movable to and from printing relation with the platen, means controlled by actuation of the key lever for effecting initial movement of the type bar toward the platen, means for checking the movement of the type bar toward the platen including a pivotally mounted member connected to the type bar, and means for connecting the key lever and said pivotally mounted member during a portion of an operative movement of the key lever for positively moving said member to effect completion of a movement of the type bar toward the platen.

2. In a typewriting machine, the combination of a platen, a depressible key lever, a pivotal type bar mounted to swing upward and rearward into printing relation with the platen, means controlled by actuation of the key lever for effecting initial movement of the type bar toward the platen, means for checking the movement of the type bar toward the platen including a pivotally mounted member connected to and extending forward from the type bar, and means for establishing a connection between the key lever and said pivotally mounted member for positively moving said member to effect completion of a movement of the type bar toward the platen.

3. In a typewriting machine, the combination of a platen, a key lever, a type bar movable to and from printing relation with the platen, means controlled by actuation of the key lever for effecting initial movement of the type bar toward the platen, means for checking the movement of the type bar toward the platen prior to its coming into printing relation to the platen including a member pivotally supported in advance of the platen and connected to the type bar, and means connected with the key-lever for moving said member about its pivotal support, after the movement of the type bar has been checked, to effect completion of a movement of the type bar to printing relation with the platen.

4. In a typewriting machine, the combination of a platen, a depressible key lever, a type bar movable to and from printing relation to the platen, means controlled by depression of the key lever for effecting initial movement of the type bar toward the platen, means for checking such movement of the type bar including a member connected to said bar and extending at an angle to the length of the bar when its movement toward the platen is checked, and means including a member extending upward from the key lever for positively actuating said first mentioned member to effect completion of movement of the type bar into printing relation with the platen.

5. In a typewriting machine, the combination of a platen, a depressible key lever, a type bar movable to and from printing relation to the platen, means controlled by depression of the key lever for effecting initial movement of the type bar toward the platen, means for checking such movement of the type bar including a member connected to said bar and extending substantially at right angles to the length of the bar when its movement toward the platen is checked, and means adapted to be positively actuated by the key lever for imparting a substantially longitudinal movement to said member to effect completion of movement of the type bar into printing relation to the platen.

6. In a typewriting machine, the combination of a platen, a key lever, a type bar movable to and from printing relation with the platen, means controlled by actuation of the key lever for effecting initial movement of the type bar toward the platen, means for checking the movement of the type bar toward the platen, prior to its coming into printing relation to the platen and including a pivotally mounted member connected to the type bar, and supplemental means connected with the key lever and adapted to positively rock said pivotal member during the later portion of an operative movement of the key lever to effect completion of movement of the type bar into printing relation to the platen.

7. In a typewriting machine, the combination of a platen, a key lever, a type bar movable to and from printing relation with the platen, means controlled by actuation of the key lever for effecting initial movement of the type bar toward the platen, means for checking the movement of the type bar toward the platen including a pivotally mounted member connected to the type bar, a pivotally mounted fulcrum support for said member, and means for connecting the key lever and said fulcrum support whereby downward movement of the key after movement of the type bar has been checked will rock said fulcrum support and move said member in the direction of its length to effect completion of movement of the type bar into printing relation to the platen.

8. In a typewriting machine, the combination of a platen, a key lever, a type bar movable to and from printing relation with the platen, means controlled by actuation of the key lever for effecting initial movement of the type bar toward the platen, means for checking the movement of the type bar toward the platen including a pivotally mounted member connected to the type bar, a pivotally mounted fulcrum support for said member, and a rod extending upward from the key lever and adapted as the key is depressed beyond the position assumed when movement of the type bar toward the platen is checked to engage and positively rock the fulcrum support to move said member in the direction of its length to effect completion of movement of the type bar into printing relation to the platen.

9. In a typewriting machine, the combination of a platen, a depressible key lever, a pivoted type bar adapted to swing upward and rearward into printing relation to the platen, a sub-lever interposed between the key-lever and type bar and adapted to effect initial movement of the type bar toward the platen as the key lever is depressed, means for checking such movement of the type bar including a member connected to the type bar and extending substantially horizontally therefrom when movement of the type bar is checked, and a rod extending upward from the key lever and adapted, as said lever is depressed beyond the position assumed when movement of the type bar is checked, to move said member in the direction of its length to effect completion of the movement of the type bar to printing relation to the platen.

10. In a typewriting machine, the combination of a platen, a depressible key lever, a pivoted type bar adapted to swing upward and rearward into printing relation to the platen, a sub-lever interposed between the key-lever and type bar and adapted to effect initial movement of the type bar toward the platen as the key lever is depressed, means for checking such movement of the type bar including a pivotally mounted member connected to the type bar and projecting laterally therefrom when movement of the type bar is checked, a pivotal fulcrum support for said member, and means actuated by depressing the key lever beyond the position assumed when movement of the type bar is checked for positively moving the fulcrum support of said member to cause the latter to effect completion of movement of the type bar into printing relation to the platen.

11. In a typewriting machine, the combination of a platen, a key lever, a type bar movable to and from printing relation with the platen, means controlled by actuation of the key lever for effecting initial movement of the type bar toward the platen, means for checking the movement of the type bar toward the platen prior to its coming into printing relation to the platen and including a pivotally mounted member connected to the type bar, and a connecting means extending upward from the key lever and adapted as the key lever is depressed beyond the position assumed when movement of the type bar is checked to engage and positively rock said pivotally mounted member to effect completion of movement of the type bar to printing relation to the platen.

12. In a typewriting machine, the combination of a platen, a key lever, a pivotally mounted type bar, means controlled by actuation of the key lever for effecting initial swinging movement of the type bar toward the platen, means connected to and moving with the type bar for checking movement of such bar toward the platen prior to its coming into printing relation to the platen, and supplemental means positively actuated by the key lever, after the movement of the type bar has been checked, for effecting completion of movement of the type bar to printing relation to the platen in a substantially straight line direction.

13. In a typewriting machine, the combination of a platen, a key lever, a type bar movable to and from printing relation with the platen, means controlled by actuation of the key lever for effecting initial movement of the type bar toward the platen, means for checking the movement of the type bar toward the platen prior to its reaching printing relation to the platen including a link-like member pivotally supported in advance of the platen and having its rear end connected to the type bar, and means connected with the key-lever for moving the link relative to its pivotal support to effect completion of a movement of the type bar toward the platen.

14. In a typewriting machine, the combination of a platen, a key lever, a type bar movable to and from printing relation with the platen, means controlled by actuation of the key lever for effecting initial movement of the type bar toward the platen, means for the checking the movement of the type bar toward the platen, including a pivotally mounted member connected to the type bar, and supplemental means connected with the key lever and adapted to positively shift the fulcrum of said pivotal member during the latter portion of an operative movement of the key lever to move said member in the direction of its length to effect completion of movement of the type bar into printing relation to the platen.

15. In a typewriting machine, the combination of a platen, a type carrier mounted to swing upward to printing relation to the platen, means for checking movement of the type carrier toward the platen prior to the carrier coming into printing relation to the platen including a pivotally mounted member which remains stationary until said movement of the type carrier is checked and is thereafter bodily rocked to effect completion of movement of the type carrier to printing relation to the platen, a key lever, and means actuated by operation of the key lever for effecting successively movement of the type carrier and said pivotally mounted member.

16. In a typewriting machine, the combination of a platen, a depressible key lever, a type bar movable to and from printing relation with the platen, means controlled by depression of the key lever for effecting movement of the type bar toward the platen, means for checking such movement of the type bar prior to its reaching printing relation with the platen, including a pivotally mounted member connected with the type bar, and means, actuated by movement of the key lever after the movement of the type bar has been checked, for rocking said pivotally mounted member to effect completion of movement of the type bar into printing relation to the platen.

17. In a typewriting machine, the combination of a platen, a key lever, a pivotally mounted type bar movable to and from printing relation with the platen, means controlled by actuation of the key lever for effecting movement of the type bar toward the platen, means for checking such movement of the type bar prior to its reaching printing relation with the platen, including a pivotally mounted member connected with the type bar, and supplemental means, actuated by the key lever after the movement of the type bar has been checked, for rocking said pivotal member and effecting completion of the movement of the type bar towards the platen.

18. In a typewriting machine, the combination of a platen, a key lever, a type bar movable to and from printing relation with the platen, means actuated during the first portion of an operative movement of the key lever for effecting movement of the type bar toward the platen, means for checking movement of the type bar toward the platen prior to the bar coming into printing relation to the platen, and including a member connected to the type bar and pivotally supported in advance of the platen, and supplemental means, actuated by the key lever after the movement of the type bar has been checked, for rocking said pivotally mounted member to effect completion of the movement of the type bar toward the platen.

19. In a typewriting machine, the combination of a platen, a depressible key lever, a pivoted type bar, means controlled by depression of the key lever for effecting movement of the type bar toward the platen, means movable with the type bar for checking such pivotal movement of the type bar prior to the bar coming into printing relation to the platen, and supplemental means providing a positive connection between the key lever and type bar, after such movement of the type bar has been checked, and effecting completion of the movement of the type bar toward the platen.

20. In a typewriting machine, the combination of a platen, a type carrier movable to and from printing relation with the platen, and means for moving the type carrier into printing relation to the platen including a normally collapsed toggle, the straightening of which acts to check movement of the type carrier prior to the latter's contacting with the platen, and means for moving the toggle substantially in the direction of its length to complete the printing movement of the type carrier.

21. In a typewriting machine, the combination of a platen, a type carrier movable to and from printing relation with the platen, and means for moving the type carrier into printing relation to the platen including a normally collapsed toggle, the straightening of which acts to check movement of the type carrier prior to the latter's contacting with the platen, and a rocking member connected with and adapted to supplement the action of the toggle to complete printing movement of the type carrier.

22. In a typewriting machine, the combination of a platen, a type carrier movable to and from printing relation with the platen, and means for moving the type carrier into printing relation to the platen including a normally collapsed toggle, one member of which is adapted to move the type carrier as the toggle is expanded, a pivotally mounted support for the other toggle member, and means whereby the support is rocked to supplement the action of the toggle in completing printing movement of the type carrier.

23. In a typewriter, a type bar pivoted for an upward and rearward operative swing, a toggle comprising two pivotally connected members of which one has a pivotal connection with the type bar, a swingable link portion having a pivotal connection with the other of said toggle members, said link portion being swingable downwardly from its normal position of rest and rearwardly, a key bar operable to move the toggle members from a normally collapsed downwardly extending position to a relatively straightened position and to impart to the type bar a terminally checked throw to a position slightly in advance of striking position, and means thereupon effective to operatively swing said link portion to complete the stroke of the type bar through said toggle.

24. In a typewriter, a type bar pivoted for an upward and rearward operative stroke, a toggle comprising two pivotally connected members of which one has a pivotal connection with the type bar, a swingable link portion having a pivotal connection with the other of said toggle members, said link portion being swingable downwardly from its normal position of rest and rearwardly, a key bar having a connection with said toggle and operable to move the toggle members from a normally collapsed downwardly extending position to a relatively straightened position and to impart to the type bar a terminally checked throw to a position slightly in advance of striking position, and means external of said connection thereupon effective to swing said link portion to complete the stroke of the type bar through said toggle.

25. In a typewriter, a type bar pivoted for an upward and rearward operative swing, a toggle comprising two pivotally connected members of which one has a pivotal connection with the type bar, a swingable link portion having a pivotal connection with the other of said toggle members, said link portion being swingable downwardly from its normal position of rest and rearwardly, a key bar operable to move the toggle members from a normally collapsed downwardly extending position to a relatively straightened position and to impart to the type bar a terminally checked throw to a position slightly in advance of striking position, means thereupon effective to operatively swing said link portion to complete the stroke of the type bar through said toggle, and power-storing means tending to restore said link portion.

26. In a typewriter, a type bar pivoted for an upward and rearward operative stroke, a toggle comprising two pivotally connected members of which one has a pivotal connection with the type bar, a swingable link portion having a pivotal connection with the other of said toggle members, said link portion being swingable downwardly from its normal position of rest and rearwardly, a key bar having a connection with said toggle and operable to move the toggle members from a normally collapsed downwardly extending position to a relatively straightened position and to impart to the type bar a terminally checked throw to a position slightly in advance of striking position, means external of said connection thereupon effective to swing said link portion to complete the stroke of the type bar through said toggle, and power-storing means tending to restore said link portion.

27. In a typewriter, a type bar pivoted for an upward and rearward operative stroke, a toggle comprising two pivotally connected members of which one has a pivotal connection with the type bar, a swingable link portion having a pivotal connection with the other of said toggle members, said link portion being swingable downwardly from its normal position of rest and rearwardly, a key bar having a connection with said toggle and operable to move the toggle members from a normally collapsed downwardly extending position to a relatively straightened position and to impart to the type bar a terminally checked throw to a position slightly in advance of striking position, said connection including means acting on the type bar exclusively of the toggle during said terminally checked throw, and means external of said connection thereupon effective to swing said link portion to complete the stroke of the type bar through said toggle.

28. In a typewriter, a type bar pivoted for an upward and rearward operative stroke, a toggle comprising two pivotally connected members of which one has a pivotal connection with the type bar, a swingable link portion having a pivotal connection with the other of said toggle members, said link portion being swingable downwardly from its normal position of rest and rearwardly, a key bar having a connection with said toggle and operable to move the toggle members from a normally collapsed downwardly extending position to a relatively straightened position and to impart to the type bar a terminally checked throw to a position slightly in advance of striking position, said connection including means acting on the type bar exclusively of the toggle during said terminally checked throw, means external of said connection thereupon effective to swing said link portion to complete the stroke of the type bar through said toggle, and power-storing means tending to restore said link portion.

CARL A. JOERISSEN.